US008463697B1

(12) United States Patent
Narayan et al.

(10) Patent No.: US 8,463,697 B1
(45) Date of Patent: Jun. 11, 2013

(54) METHOD AND SYSTEM FOR PROVIDING A LOAN USING EQUITY IN A NEW HOME

(75) Inventors: Govind Narayan, Richmond, VA (US); Joseph R. Scarpa, Midlothian, VA (US); Edward L. Robinson, Jr., Midlothian, VA (US); Steve Wunker, Boston, MA (US); Alex Leichtman, Cambridge, MA (US); David Duncan, Brookline, MA (US)

(73) Assignee: Liberty Home Equity Solutions, Inc., Rancho Cordova, CA (US)

( * ) Notice: Subject to any disclaimer, the term of this patent is extended or adjusted under 35 U.S.C. 154(b) by 0 days.

(21) Appl. No.: 11/690,534

(22) Filed: Mar. 23, 2007

Related U.S. Application Data

(60) Provisional application No. 60/884,364, filed on Jan. 10, 2007.

(51) Int. Cl.
*G06Q 40/00* (2012.01)

(52) U.S. Cl.
USPC .............................................. 705/38; 705/40

(58) Field of Classification Search
USPC ................................... 705/38, 40, 7.11, 7.42
See application file for complete search history.

(56) References Cited

U.S. PATENT DOCUMENTS

| | | | |
|---|---|---|---|
| 4,597,046 A | 6/1986 | Musmanno et al. | |
| 4,722,055 A | 1/1988 | Roberts | |
| 4,750,121 A | 6/1988 | Halley et al. | |
| 4,752,877 A | 6/1988 | Roberts et al. | |
| 4,774,663 A | 9/1988 | Musmanno et al. | |
| 4,839,804 A | 6/1989 | Roberts et al. | |
| 4,969,094 A | 11/1990 | Halley et al. | |
| 4,975,840 A | 12/1990 | DeTore et al. | |
| 5,083,270 A | 1/1992 | Gross et al. | |
| 5,206,803 A | 4/1993 | Vitagliano et al. | |
| 5,235,507 A | 8/1993 | Sackler et al. | |
| 5,270,922 A | 12/1993 | Higgins | |
| 5,903,879 A | 5/1999 | Mitchell | |
| 5,950,175 A | 9/1999 | Austin | |
| 5,987,435 A | 11/1999 | Weiss et al. | |
| 5,991,745 A | 11/1999 | Kiritz | |
| 6,012,047 A | 1/2000 | Mazonas et al. | |
| 6,173,276 B1 | 1/2001 | Kant et al. | |
| 6,233,566 B1 | 5/2001 | Levine et al. | |
| 6,275,807 B1 | 8/2001 | Schirripa | |
| 6,315,196 B1 | 11/2001 | Bachman | |
| 6,513,020 B1 | 1/2003 | Weiss et al. | |
| 6,571,219 B1 | 5/2003 | Spivey | |

(Continued)

OTHER PUBLICATIONS

Lenders et al., "GSES East Mortgage Forbearance for Military." Mortgage Banking, 2003, 63(9), p. 14.*

(Continued)

*Primary Examiner* — Thomas Dixon
*Assistant Examiner* — Benjamin S Fields
(74) *Attorney, Agent, or Firm* — Hunton & Williams LLP

(57) ABSTRACT

Systems and methods are disclosed for financing a transition of a borrower between ownership of a prior home to ownership of a new home in conjunction with services. The transition is associated with an increase in living situation cost of the borrower between a prior living situation cost and a new living situation cost, the new living situation cost including the new home and the services. The method alleviates cash flow burden to the borrower by allowing minimal or no monthly payments for as long as the borrower occupies the home.

26 Claims, 10 Drawing Sheets

U.S. PATENT DOCUMENTS

| | | |
|---|---|---|
| 6,615,187 B1 | 9/2003 | Ashenmil et al. |
| 6,772,136 B2 | 8/2004 | Kant et al. |
| 6,904,412 B1 | 6/2005 | Broadbent et al. |
| 6,985,886 B1 | 1/2006 | Broadbent et al. |
| 7,035,820 B2 | 4/2006 | Goodwin et al. |
| 7,089,202 B1 | 8/2006 | McNamar et al. |
| 7,089,503 B1 * | 8/2006 | Bloomquist et al. .......... 715/780 |
| 7,107,239 B2 | 9/2006 | Graff |
| 7,647,261 B2 | 1/2010 | Merton et al. |
| 8,175,971 B1 | 5/2012 | Landry |
| 2001/0037287 A1 | 11/2001 | Broadbent et al. |
| 2001/0047326 A1 | 11/2001 | Broadbent et al. |
| 2001/0047328 A1 | 11/2001 | Triola |
| 2002/0055905 A1 * | 5/2002 | Jannah et al. ................... 705/38 |
| 2002/0095363 A1 | 7/2002 | Sloan et al. |
| 2002/0111890 A1 | 8/2002 | Sloan et al. |
| 2002/0147671 A1 | 10/2002 | Sloan et al. |
| 2002/0194099 A1 | 12/2002 | Weiss |
| 2003/0023544 A1 | 1/2003 | Chodes |
| 2003/0110125 A1 | 6/2003 | Carragher |
| 2003/0144936 A1 | 7/2003 | Sloan et al. |
| 2003/0144949 A1 | 7/2003 | Blanch |
| 2003/0154161 A1 | 8/2003 | Stahl et al. |
| 2003/0177071 A1 | 9/2003 | Treese et al. |
| 2004/0054613 A1 | 3/2004 | Dokken |
| 2004/0122759 A1 | 6/2004 | Spivey |
| 2004/0128229 A1 | 7/2004 | Raines et al. |
| 2004/0128230 A1 | 7/2004 | Oppenheimer et al. |
| 2004/0181475 A1 | 9/2004 | Haroon |
| 2004/0215553 A1 | 10/2004 | Gang et al. |
| 2004/0215554 A1 | 10/2004 | Kemper et al. |
| 2004/0215555 A1 | 10/2004 | Kemper et al. |
| 2004/0220872 A1 | 11/2004 | Pollock, III |
| 2004/0220873 A1 | 11/2004 | Nolan, III et al. |
| 2004/0220874 A1 | 11/2004 | Singh et al. |
| 2004/0225584 A1 | 11/2004 | Quinn et al. |
| 2004/0225594 A1 | 11/2004 | Nolan, III et al. |
| 2004/0225595 A1 | 11/2004 | Nolan, III |
| 2004/0225596 A1 | 11/2004 | Kemper et al. |
| 2004/0225597 A1 | 11/2004 | Oppenheimer et al. |
| 2004/0230521 A1 | 11/2004 | Broadbent et al. |
| 2005/0080698 A1 | 4/2005 | Perg et al. |
| 2005/0080722 A1 | 4/2005 | Kemper et al. |
| 2005/0102225 A1 | 5/2005 | Oppenheimer et al. |
| 2005/0102226 A1 | 5/2005 | Oppenheimer et al. |
| 2005/0102229 A1 | 5/2005 | Kemper et al. |
| 2005/0108029 A1 | 5/2005 | Schneider |
| 2005/0108122 A1 | 5/2005 | Schneider |
| 2005/0108123 A1 | 5/2005 | Schneider |
| 2005/0108136 A1 | 5/2005 | Schneider |
| 2005/0144103 A1 | 6/2005 | Perg et al. |
| 2005/0177491 A1 * | 8/2005 | Siverson et al. ................. 705/38 |
| 2005/0177508 A1 * | 8/2005 | Pembroke ....................... 705/40 |
| 2005/0197953 A1 | 9/2005 | Broadbent et al. |
| 2006/0015364 A1 | 1/2006 | Hays |
| 2006/0015429 A1 | 1/2006 | Sullivan et al. |
| 2006/0074787 A1 | 4/2006 | Perg et al. |
| 2006/0089892 A1 | 4/2006 | Sullivan et al. |
| 2006/0089895 A1 | 4/2006 | Joye et al. |
| 2006/0089902 A1 | 4/2006 | Kim et al. |
| 2006/0116951 A1 | 6/2006 | Kim et al. |
| 2006/0116952 A1 | 6/2006 | Orfano |
| 2006/0149647 A1 | 7/2006 | Sogin et al. |
| 2006/0184450 A1 | 8/2006 | Ely et al. |
| 2007/0011084 A1 * | 1/2007 | George ........................... 705/38 |
| 2008/0077519 A1 | 3/2008 | Pedersen et al. |
| 2008/0235061 A1 | 9/2008 | Innes |
| 2009/0287510 A1 | 11/2009 | Lange et al. |
| 2010/0211417 A1 | 8/2010 | Innes |

OTHER PUBLICATIONS

Business Editors, "Lenders, Fanni Mae Ease Mortgage Forbearance Process for Military Personnel," Business Wire, May 7, 2003, p. 1-2.*

Rodda, et al. "Refinancing Premium, Nation Loan Limit, and Long-Term Care Premium Waiver for FHA's HECM Program," Economic Research, U.S. Department of Housing and Urban Development, pp. iii-xi and 1-4, May 2003.

"Reverse Mortgage Florida," www.rmprofessor.com, Aug. 16, 2007.

"Fannie Mae Offers 'Home Keeper' Loans the Federal National . . ." The Baltimore Sun, Jan. 28, 1996.

"California Company Announces 'No Mortgage Payment for 12 Months'" PR Newswire (U.S.) Jan. 4, 2007.

"What is a reverse mortgage? Ask Financial Freedom Senior Funding," Lubbock Avalanche-Journal, Feb. 27, 2006.

Stewart, J.K. "Reverse mortgages take aim at affluent," The Baltimore Sun, Nov. 26, 2006..

* cited by examiner

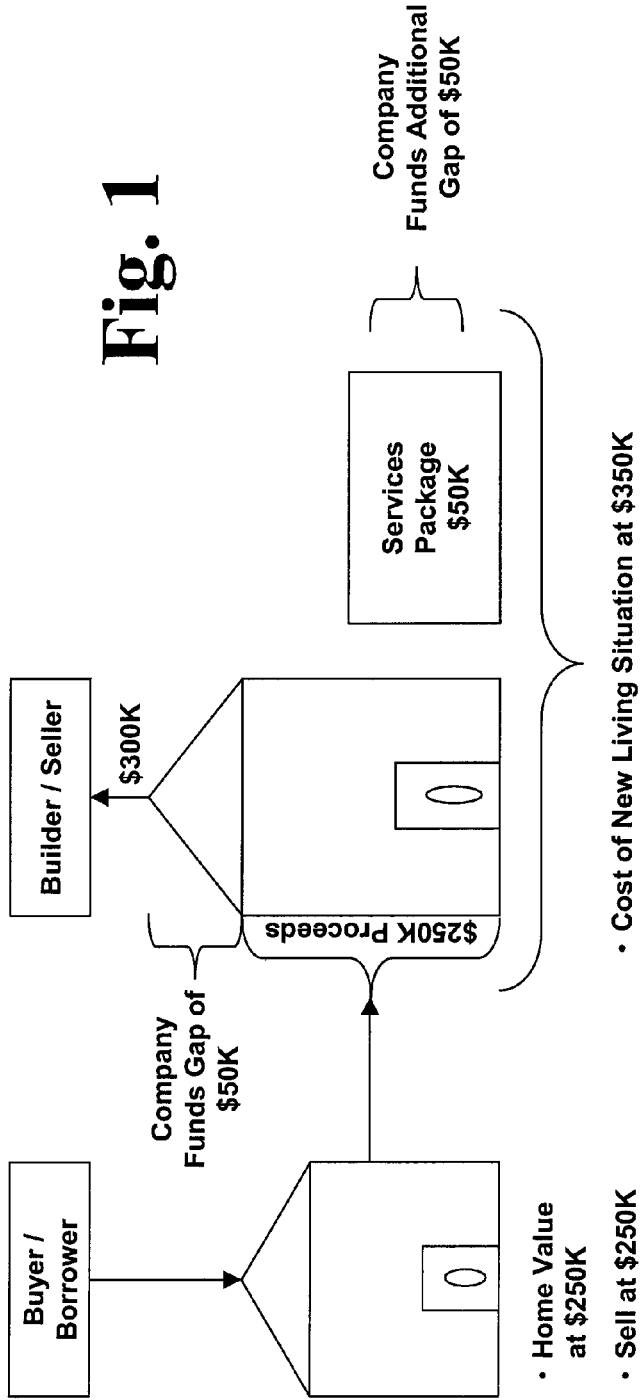

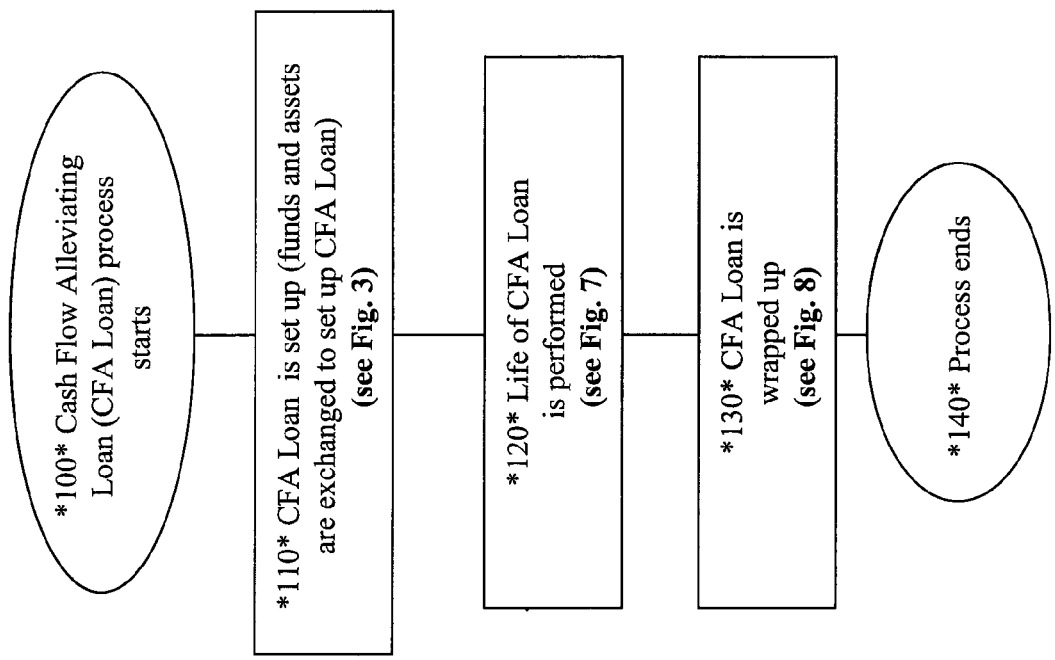

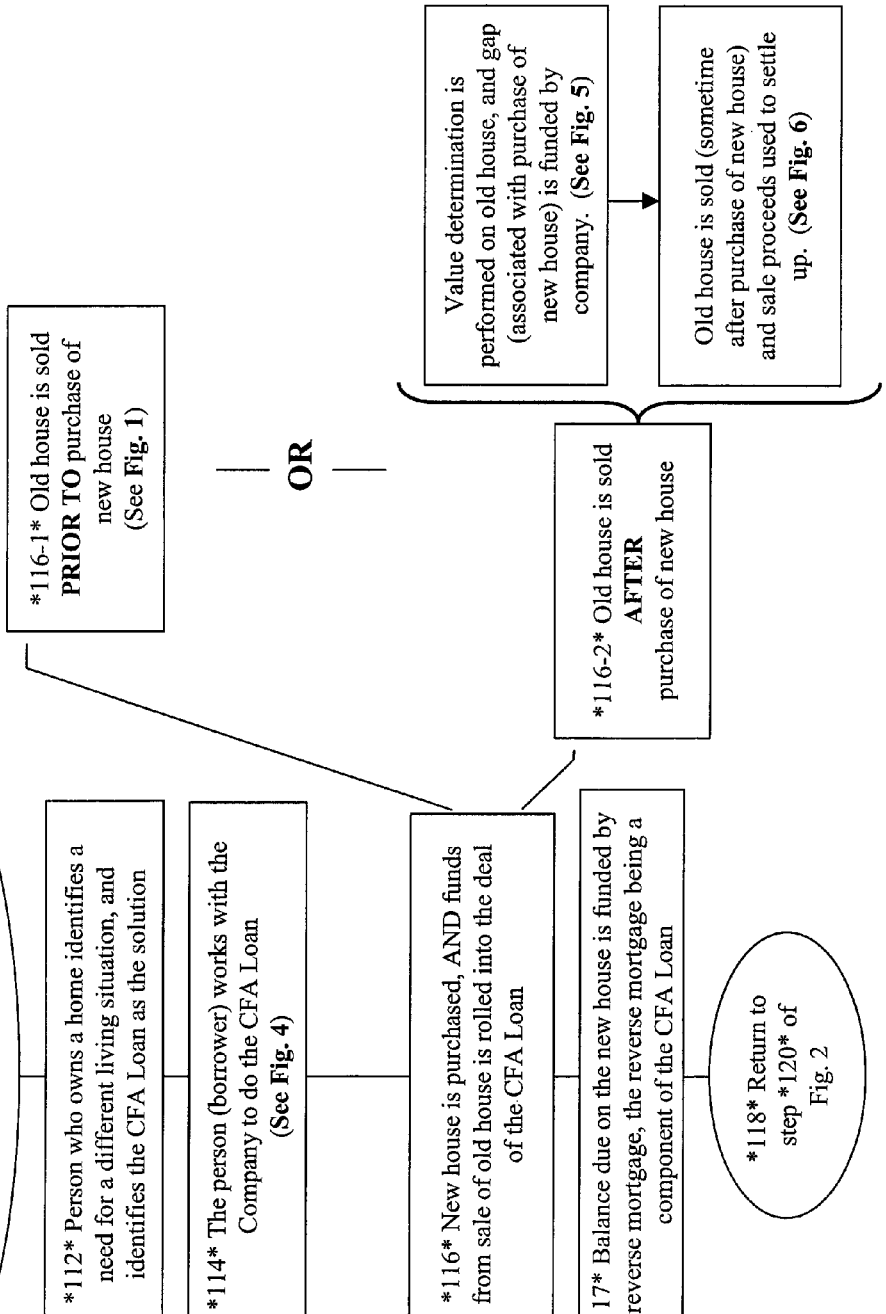

Fig. 4

*114* The person (borrower) works with the
Company to do the CFA Loan
(from Fig. 3)

*114-1* Underwriting analysis is performed, including, but not limited to:

- assessment of the likely sale proceeds (value) of the old home;
- anticipated purchase price of the new home (price range);
- any contingencies/liabilities associated with the new home;
- special circumstances of the particular deal;
- analysis of assets (and associated liabilities) outside the new home, e.g., borrower entering into service plan for elderly care);
- consideration of age of the borrower;
- interest rates;
- home price appreciation (not only of the home, but of the area in which the new home exists); and
- credit review (more particularly, ensuring personal property taxes and homeowner's insurance are up to date).

*114-2* Terms of CFA Loan are discussed with the person (borrower), including but not limited to:

- price of the new home (may be price range acceptable to do the deal);
- monies to be paid from Company to Borrower during life of CFA Loan;
- time constraints between sale of old home and purchase of new home;
- ensuring borrower understands he is required to continue paying taxes and insurance on the new home;
- borrower obligation to maintain/upkeep the new home; and
- borrower advised to work with third party counselor.

*114-3* Return to step *116* Fig. 3

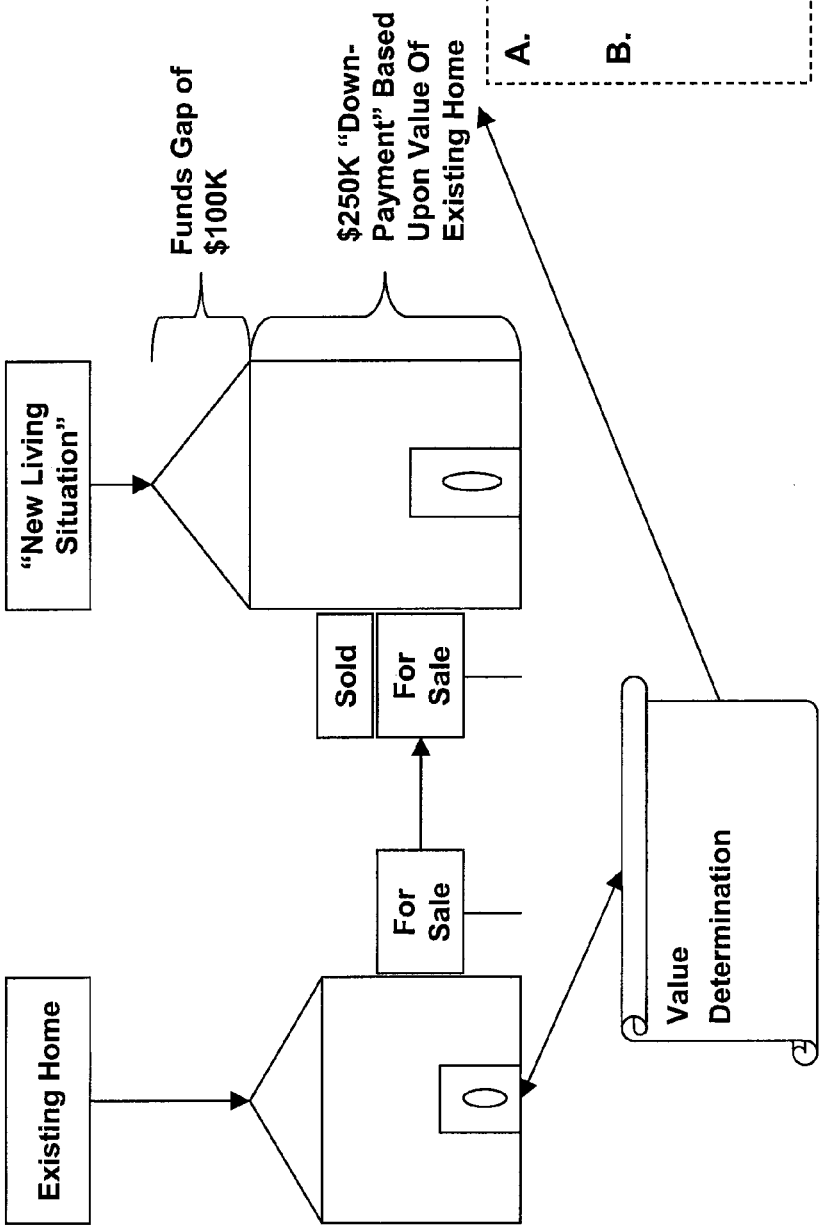

METHOD AND SYSTEM FOR PROVIDING A LOAN USING EQUITY IN A NEW HOME

RELATED APPLICATIONS

This application claims priority to U.S. Provisional Patent Application 60/884,364 filed Jan. 10, 2007 entitled METHOD AND SYSTEM FOR PROVIDING A LOAN USING EQUITY IN A NEW HOME, which is incorporated herein by reference in its entirety.

FIELD OF THE INVENTION

The invention relates to funding a new living situation, part of which includes the purchase of a new home, using equity in the new home as collateral.

BACKGROUND OF THE INVENTION

Various financial products exist that effect the transfer of funds between equity in a house and liquid assets, i.e., usable funds. For example, a reverse mortgage is a financial mechanism by which a lump sum and/or monthly payments to the owner of a home are financed by using equity in the home as collateral for a non-recourse loan, whereby the borrower is not required to make payments or repay the loan for as long as he, she or they live in the home. In such a reverse mortgage, the borrower/estate is typically required to repay the loan upon moving out of the home, upon sale of the home or upon death of the borrower, for example.

Further, it is known in the art to offer a reverse mortgage in conjunction with the purchase of a new home. Such a financial product reduces the out-of-pocket cash needed to buy the new home.

However, various shortcomings exist in the known financial products. The invention addresses these shortcomings.

BRIEF SUMMARY OF THE INVENTION

Systems and methods are disclosed for financing a transition of a borrower between ownership of a prior home to ownership of a new home in conjunction with services. The transition is associated with an increase in living situation cost of the borrower between a prior living situation cost and a new living situation cost, the new living situation cost including the new home and the services. The method alleviates cash flow burden to the borrower by allowing minimal or no monthly payments for as long as the borrower occupies the home.

As described in detail herein, the inventive financial product, including its various embodiments, is herein referred to as a "Cash Flow Alleviating Loan" (CFA Loan).

BRIEF DESCRIPTION OF THE DRAWINGS

The present invention can be more fully understood by reading the following detailed description together with the accompanying drawings, in which like reference indicators are used to designate like elements, and in which:

FIG. 1 is a diagram showing a financing process associated with a transition to a different living situation in accordance with one embodiment of the invention;

FIG. 2 is a high-level flowchart showing a financing process associated with a transition to a different living situation in accordance with one embodiment of the invention;

FIG. 3 is a flowchart showing further details of the "CFA Loan is set up" step of FIG. 2, in accordance with one embodiment of the invention;

FIG. 4 is a flowchart showing further details of the "person (borrower) works with the Company to do the CFA Loan" step of FIG. 3, in accordance with one embodiment of the invention;

FIG. 5 is a diagram showing a financing process associated with a transition to a different living situation, and in particular, such figure reflects a scenario where the new home has been purchased, but the old home has not yet been sold, in accordance with one embodiment of the invention;

DETAILED DESCRIPTION OF THE INVENTION

Figure 6:
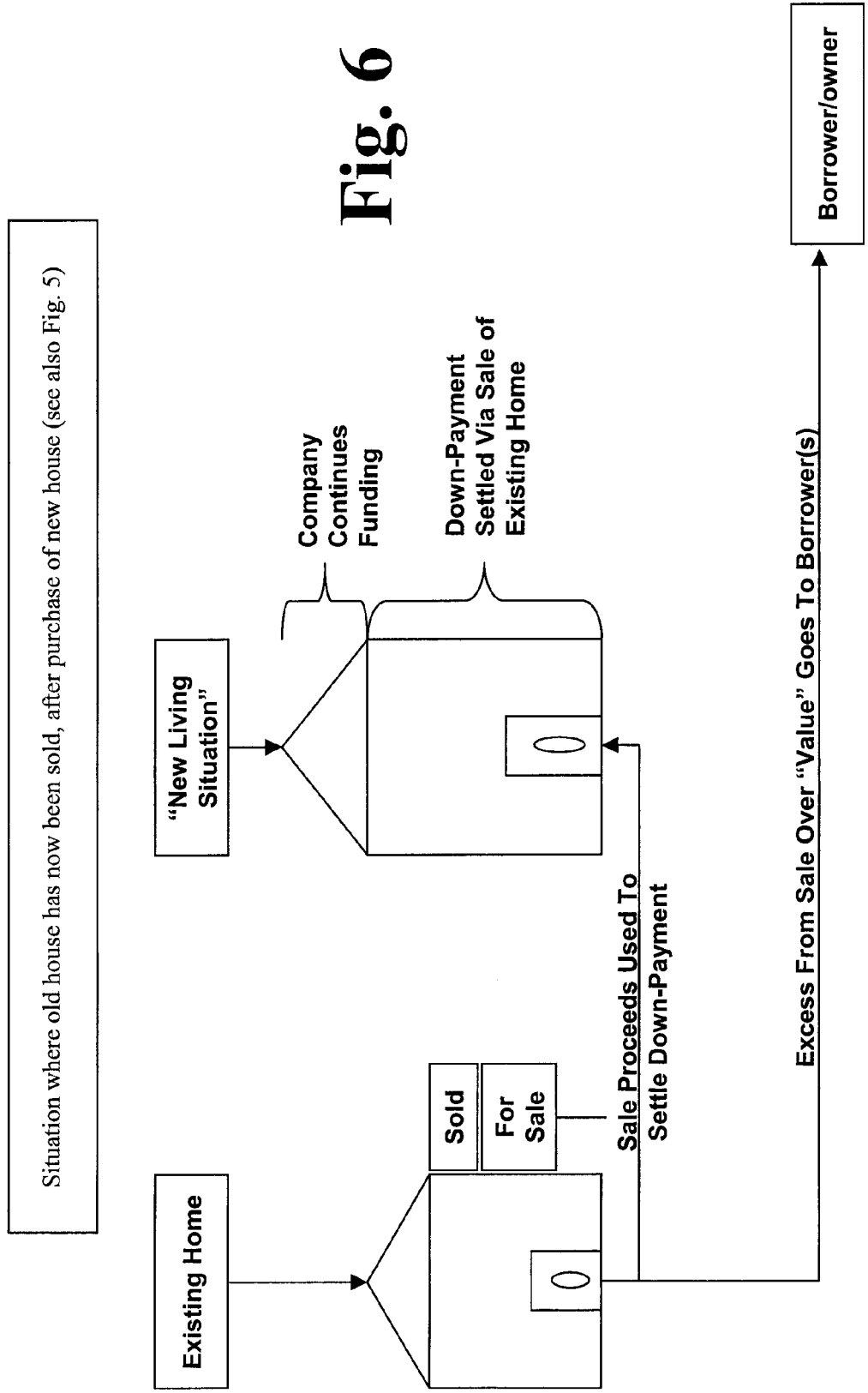
FIG. 6 is a diagram showing the continuation of the financing process of FIG. 5, associated with a transition to a different living situation, and in particular, such figure reflects a scenario where the new home has been purchased, and the old home has now been sold, the old home being sold after the purchase of the new home, in accordance with one embodiment of the invention.

Various shortcomings exist in the context of using the equity in a home to purchase a new home in conjunction with services. These shortcomings include, but are not limited to the following: 1) being able to fund, not only a new home, but the total increased cost of a new living situation, for example fees for a variety of services that are needed/desired in the new living situation; 2) being able to finance and enter into a new living situation prior to the sale of the current home; 3) being able to transition to the new living situation via the execution of a single, simplified process and experience; 4) the ability to incorporate a Home Equity Conversion Mortgage (HECM) provided by the Federal Housing Administration (FHA) into the single, simplified funding transaction; and/or 5) the ability to open up additional new living situation opportunities that borrowers may not be able to consider today and new growth opportunities for builders/property sellers, and in particular being able to bring builders and buyers together.

Accordingly, the invention provides a way of funding, not only a new home, but also the increased costs of the new living situation. The invention also makes things easier for the borrower by providing flexibility in options and timing, along with a simplified closing process.

The invention helps people achieve their aspirations, and in particular retirement aspirations, by enabling them to move to a new home and/or a new living situation, that they may not be able to otherwise afford, without impacting their cash flows. Examples of this include, but are not limited to a new home in a more expensive area, a home in a community setting with association fees, a home that requires less maintenance and/or includes maintenance services, a new living situation that includes access to certain leisure activities (golf, fishing, boating, etc.), and/or a home with customized accessories and/or living services to accommodate senior living needs.

Hereinafter, aspects of the CFA Loan (Cash Flow Alleviating Loan) will be described in accordance with various embodiments of the invention. As used herein, any term in the singular may be interpreted to be in the plural, and alternatively, any term in the plural may be interpreted to be in the singular.

As used herein, a "new home" means new to the purchaser, i.e., such new home may or may not be newly constructed. Also, as used herein, a "current home," "existing home" and "prior home" are used interchangeably, such terms meaning the home that a person owned before acquiring ownership of the new home. Further, the term "Company" as used herein refers to the entity that is involved in implementing the innovation as described herein. Typically, the "Company" is a financial institution or a collection of financial institutions.

Embodiments of the CFA Loan provide a variety of novel features. These features provide both flexibility and simplicity for the borrower, thereby affording a robust solution that meets a variety of borrower needs. Embodiments provide for the simultaneous, or near simultaneous, sale of a house in conjunction with the purchase of another house using funding for which there are little or no scheduled payments or repayments, as illustrated in FIG. 1 and discussed below. In a novel manner, the invention allows a person, couple or group, for example, to put an existing real estate asset to work by using the equity from an existing asset as a down-payment on a more expensive asset. For example, in accordance with one embodiment of the invention, not only is the person (for example a senior) able to fund a more expensive home with the equity from an existing, less expensive home as a down-payment, but for as long as the person lives in the new home, he/she will not be required to make any (or any substantial) payments, nor will the senior be required to repay any portion of the loan as long as he/she lives in the new home irrespective of whether the Company should incur a loss if the corresponding loan balance should grow to exceed the value of the home itself.

Rather, with the CFA Loan, the collectable portion of the loan balance (i.e., the portion of the loan balance that is collectable) is referred to herein as the "collectable proceeds". The collectable proceeds is limited by one of the amount accrued on the loan and the value of the home. Relatedly, as used herein, "loan balance" means the amount (generally comprising principal, interest, and any associated fees) that has accrued on the CFA Loan. As used herein, "secured value" means the value of the house serving as collateral for the CFA Loan. Accordingly, "collectable proceeds" means the lesser of the loan balance and the secured value.

Embodiments of the invention utilize, in part mechanics of a "reverse mortgage". As used herein, a "reverse mortgage" means a financial mechanism by which a lump sum and/or monthly payments to the owner of a home are financed by using equity in the home as collateral for a non-recourse loan, whereby the borrower is not required to make payments or repay the loan for as long as he, she or they live in the home.

Under current practices, the Federal & Housing Administration (FHA) requires that the borrower own the home more than 1 year and that the home be the borrower's primary residence upon initiation of the loan, to initiate a Home Equity Conversion Mortgage (HECM). Currently, the reverse mortgage market is dominated by HECM products that explicitly disallow a borrower from using a reverse mortgage to fund, and thereby move into a home which has not been owned for at least 1 year. In accordance with embodiments of the invention, the novel product will remove that requirement and allow for the immediate funding of a reverse mortgage. Included in the scope of this innovation are unique risk management practices and processes that are needed to achieve this capability, and which are driven by the mechanics of the CFA Loan.

In accordance with embodiments of the invention, the invention provides interim financing with minimal or no monthly payments to alleviate timing issues associated with the sale of the current home. As described above, the innovation allows the "simultaneous, or near simultaneous, sale of a house" to purchase a new house. However, in the event that the borrower needs to close on the new home prior to the sale of his/her existing home, the Company, i.e., the entity providing the CFA Loan described herein, will, based upon the value of the existing home and unique underwriting processes and guidelines, fund the down-payment for the new home for a certain period of time. The borrower is not required to make any (or at least no substantial) monthly payments for this interim financing. Then, when the borrower's old house is sold, the proceeds will go to the Company. Any proceeds from sale of the house above the amount owed to the Company will be returned to the borrower. In conjunction with such interim financing, the CFA Loan may include a reverse mortgage financed at the same time as the purchase of the new house. Included as part of the innovation are various underwriting, risk mitigation, and servicing practices and processes that help achieve the capabilities described herein, and which result from the mechanics of the CFA Loan.

Herein, various aspects of the invention will be described related to use of the innovation by seniors. However, the invention is not limited to seniors, i.e., elderly persons.

Currently, an unmet need exists whereby seniors, i.e., senior citizens, find themselves to be "house-rich, cash-poor." That is, most of their wealth/assets exist in the form of an illiquid real estate asset. Moreover, they find themselves in the unfortunate situation of having less income from which to draw than they ever have before, generally due to retirement. Often, seniors find they need cash to fund monthly expenses, maintain lifestyle, and help family members in need, for example, but do not have the liquid assets available to do so.

Furthermore, many of these same seniors find themselves needing to move to another home for reasons such as, but not limited to, moving to a higher-cost real estate area, requiring assisted living, needing special custom-fitted accessories built into the home to facilitate their lifestyle, desiring to have a lower maintenance home, and/or desiring to move into a retirement community.

More often than not, the home to which they want to move is more expensive than their current home. Due to financial constraints, most of these seniors are unable to take on more debt, including mortgage payments. The nature of the innovation described herein will not only mitigate these issues, but also provide seniors, in particular, an additional sense of independence and freedom.

The CFA Loan is variously described herein as utilized by seniors. However, the innovation will be applicable in any situation in which selling assets to fund the purchase of a more expensive asset with no initial cash outlay or no continued payments is the intent, and/or no scheduled repayments are required. Additionally, any situation that directly caters to seniors and embodies the spirit of enabling independence and freedom with no additional cash flow burdens will benefit. The innovation may well be applied in the situation where a person (e.g. a senior) moves into a more expensive house. However, the innovation is certainly not limited to such situation. For example, the CFA Loan may be used in the situation where the borrower secures a less expensive house, but a more expensive living situation.

Hereinafter, further unique features and applications of the innovation will be described. Highlights of the innovation include:

1. The innovation enables senior borrowers to simultaneously, or nearly simultaneously, sell an existing home and purchase a more expensive home with little or no payments or repayment requirements for the entire time they live in the new home. Included in this is enabling senior borrowers to sell an existing home to purchase more expensive asset(s), or a combination of assets and services such as a new home in conjunction with forms of insurance and/or a new home with living-care services, for example. Thus, in addition to financing the new asset, it also provides funding that can be used to pay for a variety of services which become increasingly important for seniors.

2. The innovation may involve using the equity in an existing home as a down-payment to purchase a more expensive home. That is, the sale proceeds from an existing home may be used as the down-payment. Alternatively, the value of the existing home may be used before the existing house is sold to facilitate the purchase of the new home, i.e., the Company funds the entire purchase until proceeds from the existing home sale can be received. This is a useful feature that provides greater flexibility to the borrower. Many times a senior borrower may find a new home and/or have the need to move into a new living situation before they are able to sell their current home. This feature provides the borrower the opportunity to do just that, thereby making the transition to the new living situation a much easier process and experience.

3. The innovation provides new and unique underwriting opportunities. For example, in accordance with one embodiment of the invention, the innovation enables senior borrowers to purchase a home using the basic principle of a reverse mortgage (as a component of the CFA Loan) while not being required to live in a home for at least 1 year. The innovation encompasses risk management processes that other reverse mortgage producers do not have, i.e., as a result of the arrangement of the CFA Loan as described herein. This feature also provides flexibility to the borrower and facilitates the transition process to the new living situation.

4. In accordance with one embodiment, the invention utilizes a single close process, rather than (1) an initial closing when purchasing a home followed by (2) a closing for reverse mortgage funding. Relatedly, the innovation may encompass unified documentation and procedures that simplify the process of effecting such a single close process. For example, a closing, to effect the innovation, may involve legal commitments between the borrower vis-à-vis a builder, and one or more financial institutions providing the financing. The financial institution, in conjunction with providing the financing, may administer the CFA Loan. Documents and procedures may be created to simplify the process as much as possible while satisfying the legal requirements of all the entities involved.

5. The CFA Loan provides for bridge/gap financing for one year until a reverse mortgage may be initiated. Alternatively, the CFA Loan may provide a proprietary reverse mortgage that does not require a one year waiting period.

6. The innovation provides for a system interface between various financing systems, such as between administrative systems and banking systems.

7. The innovation provides for new risk management procedures.

8. The innovation provides for creation of a new distribution channel, bringing together builders/sellers with reverse mortgage consumers and/or senior borrowers, i.e., the invention is particularly suited (but not limited to) elderly persons.

9. The innovation provides for a mobile CFA Loan office that can be relocated to various builder properties in order to facilitate the sale. That is, the CFA Loan provides a unique opportunity for a new home purchaser to secure a new home using a reverse mortgage on the new home. In order to facilitate the sales process, it is envisioned that a mobile office might be used. Such mobile office might be brought onto a building site, for example. This feature and the previous feature open up new living situation opportunities for the borrower and new growth opportunities for builders/property sellers by enabling sales that may not have been otherwise possible and facilitating the sales process.

10. The innovation provides for little or no payments or repayment for as long as one lives in the new home.

11. The innovation provides for, upon exiting the home, the loan and all corresponding fees and interest will be paid in full, up to the "collectable proceeds" amount. The home may be sold to pay the loan, or the borrower or estate may pay the loan in its entirety at any time. Additionally, if the home is sold and equity exists that is higher than the collectable proceeds, then that equity value belongs to the borrower/estate.

12. The invention may in part include an existing known financial product, such as an existing/traditional reverse mortgage.

Hereinafter, further aspects of embodiments of the invention will be described with reference to the drawings. FIG. 1 is a diagram showing a financing process associated with a transition to a different living situation (including a house and services extended to the borrower) in accordance with one embodiment of the invention.

In the situation of FIG. 1, the owner has identified a need for a different living situation, and has opted to utilize the "CFA Loan", as the invention is characterized herein, to accomplish the transition. As shown in FIG. 1, the buyer/borrower owns a home that is valued at $250,000 ($250K). The valuation is based on a selling price of the house. That is, in this example, the existing home is sold simultaneously or near simultaneously with the purchase of the new house. The purchase price of the new house is $300K. Also, the buyer/borrower wants to secure a $50,000 services package, such as a long term care package, for example. Thus, the buyer/borrower is selling an asset that is worth $250K and acquiring an asset that is worth $350K ($300K for the new home and $50K for the services package).

In order to accomplish the financing of FIG. 1, the $250K funds from sale of the existing house is applied to the purchase of the new house. Further, the $50K "gap" remaining to pay for the new house, as well as the $50K services package cost, is paid by the Company, e.g., a financial institution.

Thus, the process of FIG. 1 does not require the borrower to pay the gap, i.e., the $100K needed to fund the new home plus the services package. Also, under the mechanics of the CFA Loan process, the borrower pays minimal (if any) payments during the entire time in which the borrower lives in the home. Rather, the equity in the new home is used as collateral for the loan, and the borrower is not required to repay the loan for as long as he/she occupies the home and abides by the obligations of the contract.

It is appreciated that the particular terms of the CFA Loan (that is the terms of an offered package) may be varied as desired. In accordance with one embodiment of the invention, the borrower may never pay monthly payments on the new house. Thus, it may be the case, with a particularly long-lived borrower, that the loan balance will exceed the value of the new home upon termination of the loan, and the proceeds from the sale of the home will be a shortfall to such loan balance, i.e., since only the collectable proceeds are collectable. In this situation vis-à-vis that particular borrower, the Company will experience a loss. However, such loss would be offset by anticipated gains on other borrowers. Such would of course be determined through underwriting and actuarial analysis vis-à-vis the terms of the CFA Loan. Based upon underwriting guidelines, the amount that can be borrowed/financed for the new home will be calculated. The underwriting will determine the highest amount allowable for the new home to enable the senior borrower to never have to pay another payment, or pay minimal payments, for as long as he/she is in the new home.

As noted above, it is contemplated that under the mechanics of the process, the borrower pays minimal (if any) payments during the entire time in which the borrower lives in the home. For example, in accordance with one embodiment of the invention, the borrower may be obligated to pay property taxes, as well as paying for insurance and upkeep on the home.

Quite often seniors face a new set of living needs, such as having custom-fitted assisted living accessories, less space or landscaping to maintain, or wanting to move closer to family members. Oftentimes, these needs come with a price tag that suggests a higher home price than that of the current home in which the senior borrower lives and/or increased cash outlays. They also often have a large portion of their wealth tied up in the equity of their current home. This new innovation can assist the senior borrower in selling an existing home and moving to a more expensive home/living situation. Moreover, the innovation will provide the borrower freedom from any (or any substantial) payments/repayment for the entire time he/she lives in the new home/living situation.

In accordance with embodiments of the invention, a variety of related costs may be included in the financed amount. For example, these costs may include closing costs, the gap difference from variance in home values, as well as any interest charges and fees attributable to the bridge financing and financing of the reverse mortgage for the home.

As discussed herein, the Company may provide a funding bridge, which will provide financing while requiring the borrower to make minimal or no payments, for example. Creation of a funding bridge will enable the senior borrower to move from the existing home to the new home. For reverse mortgages which exist today (such as the HECM), the borrower must have lived in the home for at least one year prior to taking out the reverse mortgage. This issue will be eliminated by offering bridge financing and/or gap financing, i.e., funding, for the first year the borrower lives in the new home, to deal with the monetary gap that exists between the home values of the old home vis-à-vis the new home, and then rolling the bridge finance into the reverse mortgage that is created one year after occupying the new home. Alternatively, as described herein, the monetary gap between the home values may be addressed by a proprietary reverse mortgage that does not require a one year waiting period (i.e., the borrower may close on such reverse mortgage at the same time as purchasing the new home).

In further explanation of the invention, FIG. 2 is a high-level flowchart showing a financing process associated with a transition to a different living situation in accordance with one embodiment of the invention.

As shown, the process of FIG. 2 starts in step 100, and passes to step 110. In step 110, CFA Loan is set up. That is, funds and assets are exchanged, and the agreements put into place, to set up the CFA Loan. Further details of step 110 are discussed below with reference to FIG. 3.

After step 110, the process of FIG. 2 passes to step 120. In step 120, the life of the CFA Loan is performed. Further details of step 120 are discussed below with reference to FIG. 7. Thereafter, the process passes to step 130.

In step 130, the CFA Loan draws to a close and is terminated, i.e., and the CFA Loan is wrapped up. Further details of step 130 are discussed below with reference to FIG. 8.

Thereafter, the process ends in step 140.

As noted above, FIG. 3 is a flowchart showing further details of the "CFA Loan is set up" step of FIG. 2, in accordance with one embodiment of the invention.

As shown, the process of FIG. 3 starts in step 110 and passes to step 112. In step 112, a person who owns a home identifies a need for a different living situation, and identifies the CFA Loan as the solution. Then, the process passes to step 114. In step 114, the person (borrower) works with the Company to do the CFA Loan. Further details of step 114 are shown in FIG. 4, in accordance with one embodiment of the invention. After step 114, the process passes to step 116.

In step 116, a new house is purchased (i.e., at least new to the borrower), and the funds from the sale of the old house, i.e., the borrower's prior house, are rolled into the deal of the CFA Loan. Step 116 may involve two scenarios. In one scenario as illustrated by step 116-1, the old house is sold prior to the purchase of new house. As a result, the funds actually received from sale of the old house may be used in the closing of the new house. This scenario is illustrated in FIG. 1.

Alternatively, in the scenario of step 116-2 (as further illustrated in FIG. 5), the old house is sold after the purchase of the new house. In this scenario, a value determination is performed on the old house, and the Company funds the gap (associated with the purchase of the new house). Thereafter, in step 116-2 (as further illustrated by FIG. 6), the old house is sold (sometime after purchase of new house) and the sale proceeds are used to settle up with the Company.

After step 116 of FIG. 3, the process passes to step 117. In step 117, the balance due on the new house vis-à-vis the old house is funded by a reverse mortgage. That is, the reverse mortgage of step 117 is a component of the CFA Loan. In accordance with one embodiment of the invention, steps 116 and 117 occur in the same closing process and are integrated into a single document set.

Then, in step 118, the process returns to step 120 of FIG. 2.

FIG. 4 is a flowchart showing further details of the "person (borrower) works with the Company to do the CFA Loan" step of FIG. 3, in accordance with one embodiment of the invention.

As shown in the example of FIG. 4, the sub-process starts in step 114 and passes to step 114-1. In step 114-1, an underwriting analysis is performed, including, for example; assessment of the likely sale proceeds (value) of the old home; anticipated purchase price of the new home (price range); any contingencies/liabilities associated with the new home; special circumstances of the particular deal; and/or analysis of assets (and associated liabilities) outside the new home, e.g., borrower entering into service plan for elderly care, for example. As shown, further underwriting considerations include consideration of age of the borrower; interest rates; home price appreciation (not only of the home, but also of the area in which the new home exists); and/or credit review (more particularly, ensuring personal property taxes and homeowner's insurance are up to date)

After step 114-1, the process passes to step 114-2. In step 114-2, the terms of CFA Loan are discussed with the person (borrower), including price of the new home (may be price range acceptable to do the deal); monies to be paid from Company to Borrower during life of CFA Loan; and/or time constraints between sale of old home and purchase of new home, for example. Further, in step 114-2, the Company may take steps to ensure the borrower understands his/her/their obligations, e.g., the borrower may be required to continue paying taxes and insurance on the new home, and that the borrower may be under an obligation to maintain/upkeep the new home. Further, in step 114-2, the Borrower may be advised to consult with a third party counselor.

Then in step 114-3, the process returns to step 116 of FIG. 3.

FIG. 5 is a diagram showing a financing process associated with a transition to a different living situation, and in particular FIG. 5 shows a scenario where the borrower's current home is sold after the purchase of the new home, in accordance with one embodiment of the invention. That is, in the situation of FIG. 5, the current borrower's house has not yet been sold at the time of closing the CFA Loan. As a result, the value of the house, as determined by the Company, must be used. FIG. 6 is a diagram showing a financing process associated with a transition to a different living situation, and in particular, FIG. 6 reflects the scenario where the new home has been purchased, and the old home has now been sold, the old home being sold after the purchase of the new home, in accordance with one embodiment of the invention.

Accordingly, both FIGS. 5 and 6 reflect the situation where the borrower's old house is sold after the purchase of the new house. However, FIGS. 5 and 6 are different in that FIG. 5 depicts the scenario before the old house is sold vis-à-vis FIG. 6 depicts the scenario after the old house is sold.

Figure 7:
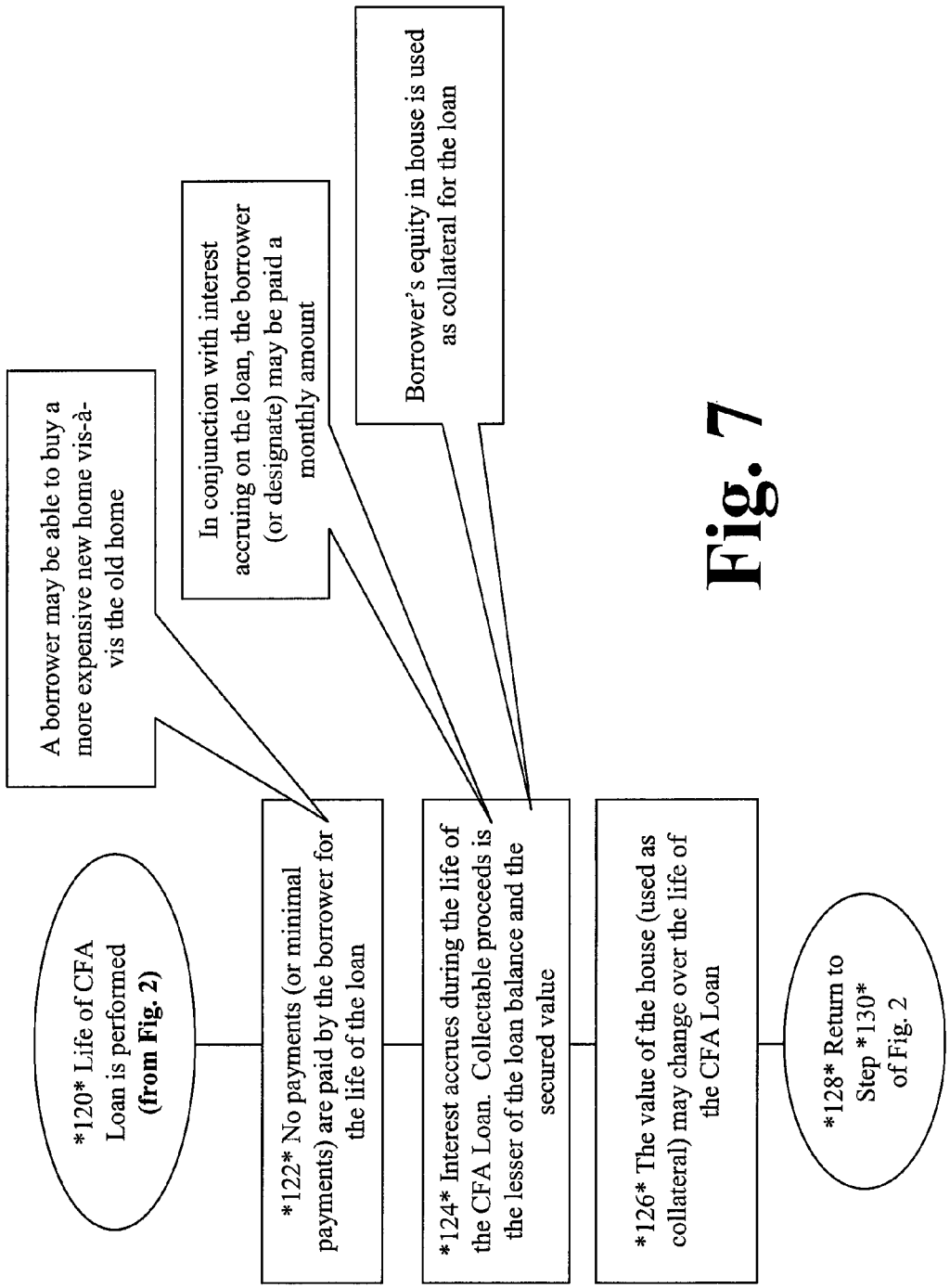
FIG. 7 is a flowchart showing further details of the "life of the loan is performed" step of FIG. 2, in accordance with one embodiment of the invention.

FIG. 7 is a flowchart showing further details of the "life of the CFA Loan is performed" step of FIG. 2, in accordance with one embodiment of the invention.

The process of FIG. 7 starts in step 120 and passes to step 122. In step 122, the flowchart reflects that the borrower makes no payments (or minimal payments) for the life of the loan. This allows a borrower, for example, to buy a more expensive home. It is appreciated that the borrower may make some payments. For example, a small administrative fee might be paid. Further, it is contemplated that the borrower might be responsible for paying fees that might include Home Owner Association (HOA) fees, for example. Additionally, the borrower may be required to pay property taxes and homeowner's insurance for the entirety of time in the home.

After step 122, the process passes to step 124. Step 124 reflects that interest accrues during the life of the CFA Loan. As described above, the "collectable proceeds" portion of the loan balance is the lesser of the loan balance and the secured value. As shown in FIG. 7, in addition to interest accruing, the borrower may be paid a monthly amount, which would also be added to the loan balance. For example, such a monthly amount may be used by the borrower to pay for care of the borrower.

After step 124, the process passes to step 126. Step 126 reflects that the value of the house (used as collateral) may, and typically does, change over the life of the CFA Loan.

After step 126, the process passes to step 128. In step 128, the process returns to step 130 of FIG. 2.

It is appreciated that the life of the CFA Loan as depicted in FIG. 7 may also include the CFA Loan being bought and sold by different financial institutions. That is, the CFA Loan, as a complete package held by a financial institution, might be bought and sold. Further, it is envisioned that the CFA Loan might be broken into components. Such components might be bought or sold, either alone or together. For example, the CFA Loan might be broken into a reverse mortgage component and a forward mortgage component. That is, in accordance with one embodiment of the invention, monthly payments flowing from the reverse mortgage would be used to pay the forward mortgage. Such assets (including the CFA Loan as a complete package and/or components thereof) may also be securitized in some suitable manner.

It is noted that both the bridge financing and reverse mortgage are non-recourse, meaning the senior borrower's obligation to repay the loan are limited to the value of the home. For as long as the borrower is in the home and fulfills the contractual obligations, little or no payments or repayment will be required.

Figure 8:
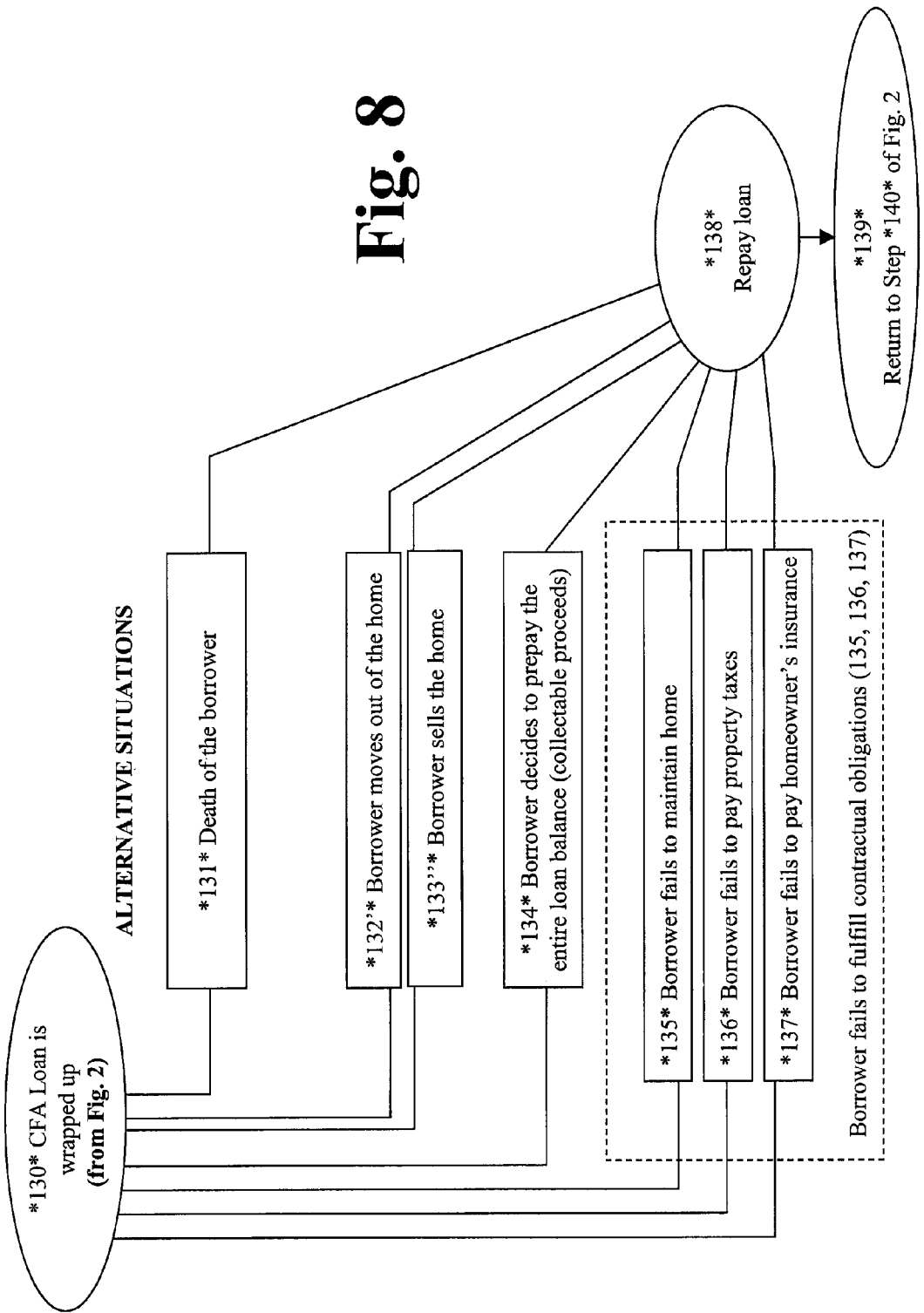
FIG. 8 is a flowchart showing further details of the "loan is wrapped up" step of FIG. 2, in accordance with one embodiment of the invention.

FIG. 8 is a flowchart showing further details of the "CFA Loan is wrapped up" step of FIG. 2, in accordance with one embodiment of the invention. At some point in time the new home will be sold and the loan resolved. That is, upon exiting the new home, the home is sold and the proceeds are used to pay the Company the principal balance, as well as any incremental fees and accrued interest. While the borrower will pay little or no payments during the life of the loan, and will not be required to repay at any time during the life of the loan, the borrower, e.g., a senior borrower or his/her/their estate, will retain all equity above and beyond the collectable proceeds in accordance with the terms of the CFA Loan, in accordance with one embodiment of the invention. The methods by which the loan will terminate include, for example, (1) Death of the final/youngest senior borrower, (2) Borrower moves out of the home, (3) Borrower prepays the entire loan balance (i.e., specifically the collectable proceeds), (4) Borrower fails to perform the contractual obligations defined in the loan agreement, such as maintaining the home, paying property taxes, or paying insurance on the home.

Accordingly, FIG. 8 is a flowchart showing further details of step 130 of FIG. 2 and wrapping up the CFA Loan. That is, FIG. 8 reflects different situations in which the CFA Loan might be wrapped up. Step 131 reflects that the CFA Loan might be terminated by the death of the borrower, step 132 reflects the CFA Loan might be terminated by the borrower moving out of the home, step 133 reflects that the borrower might sell the home, step 134 reflects that the borrower decides to prepay the entire loan balance (i.e., specifically the collectable proceeds). Also, steps 135, 136 and 137 reflect the CFA Loan might be terminated if the borrower fails to perform the contractual obligations defined in the loan agreement, such as maintaining the home, paying property taxes on the home, or paying insurance on the home. Any of these scenarios may result in termination of the CFA Loan. However, such is not an exhaustive list. Other scenarios may result in termination of he loan.

After any of steps 131-137, the process passes to step 138. In step 138, the repayment of the loan is actually performed. That is, the borrower pays the financial institution the collectable proceeds, i.e., the lesser of the loan balance and the secured value of the home After step 138, the process passes to step 139. In step 139, the process returns to step 140 of FIG. 2.

In accordance with one embodiment of the invention, the borrower fully owns his current home prior to entering into the CFA Loan, i.e., there is no remaining balance on the borrower's current home. However, the invention is not limited to such situation. That is, the CFA Loan product may well be implemented in a situation where there is some remaining balance on the borrower's home. Such remaining balance may be rolled into the deal of the CFA Loan in any manner agreeable to the parties.

Figure 9:
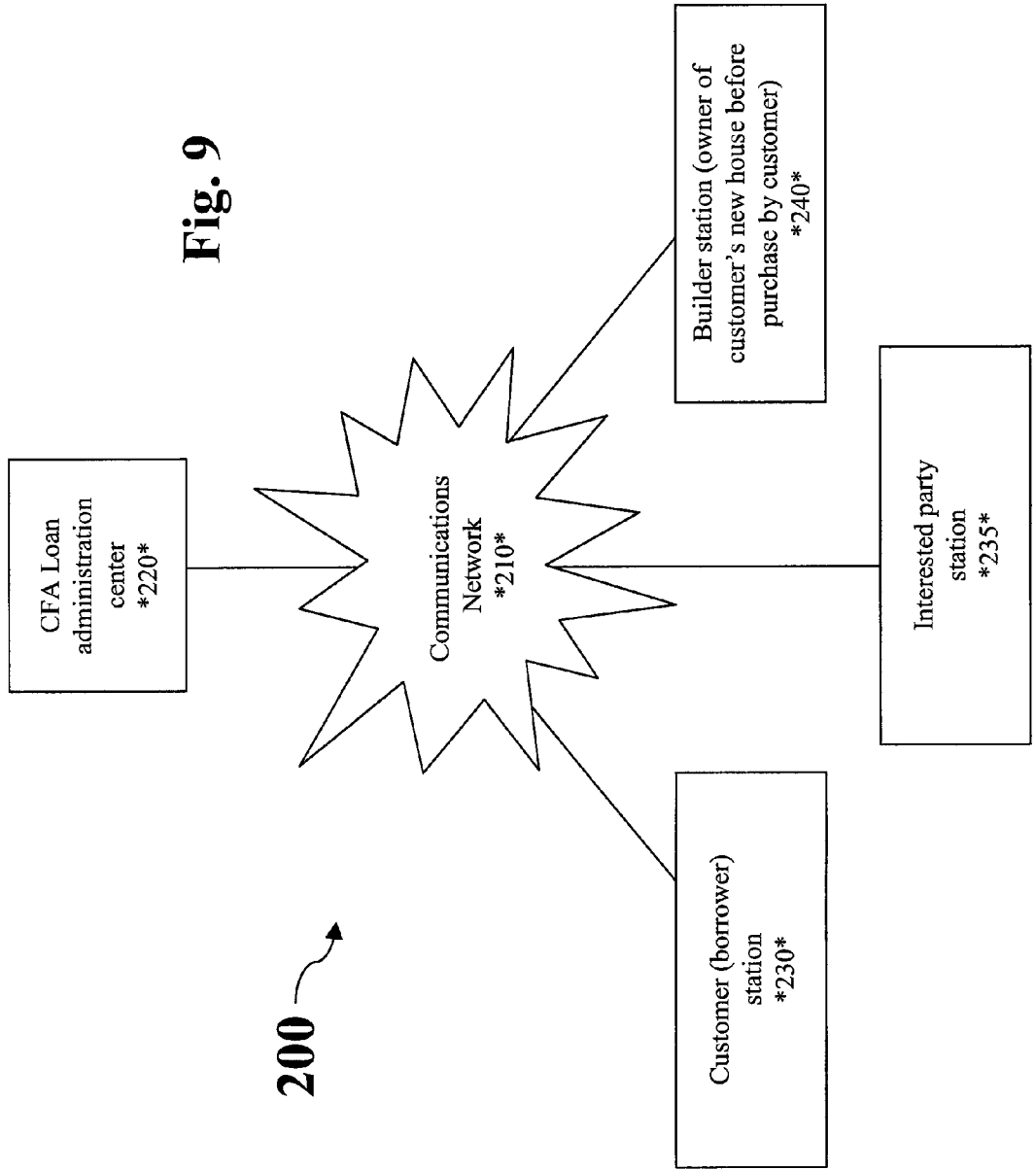
FIG. 9 is a block diagram showing a system in accordance with one embodiment of the invention.

FIG. 9 illustrates one embodiment of a CFA Loan system 200 for generating and managing CFA Loans, according to various embodiments of the systems and methods described herein. System 200 may include a CFA Loan administration center 220, a customer station 230, an interested party station 235 and a builder station 240. The CFA Loan administration center 220, a customer station 230, the interested party station 235 and a builder station 240 may all be connected through communications network 210.

The CFA Loan administration center 220 may comprise the processing station or center of an issuer of a CFA Loan, such as an insurance company, bank, brokerage firm, or other financial institution, for example. The customer station 230 may comprise the terminal or access point for a borrower. The interested party station 235 may comprise the terminal or access point for other parties who have an interest in the CFA Loan, such as owners, purchasers, lenders, investors, consumers, or beneficiaries, for example. The builder station 240 may comprise the terminal or access point for the builder of a house, e.g., or some other owner of the customer's (borrower's) new house, before the customer purchases the house. Communications network 210 interconnects CFA Loan administration center 220, the customer station 230, the interested party station 235, and the builder station 240 to enable communication and transfer of data and information. Each is described in more detail below.

Figure 10:
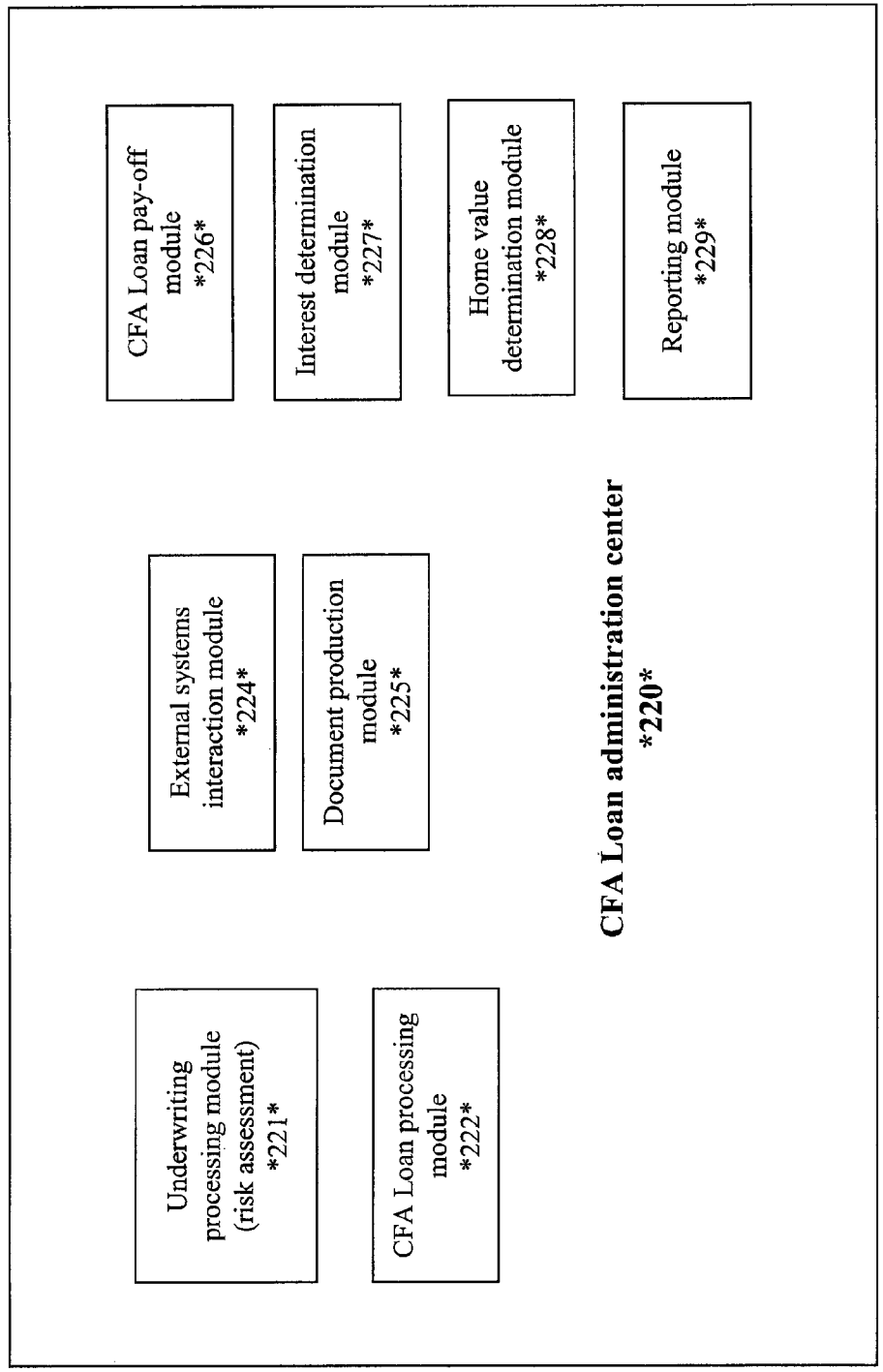
FIG. 10 is a block diagram showing further details of the loan administration center of FIG. 9 in accordance with one embodiment of the invention.

CFA Loan administration center 220 may comprise a single server or engine (as shown). In some embodiments, CFA Loan administration center 220 may comprise a plurality of servers or engines, dedicated or otherwise, which may further host modules for performing the various system functionality described herein. CFA Loan administration center 220, for example, may host one or more applications or modules that function to permit interaction between the users (e.g., borrowers, financial institutions, underwriters, and other parties) as it relates to the issuing and administration, for example, of CFA Loans as set forth herein. For instance, the CFA Loan administration center 220 may include an administration module that serves to permit interaction between the system and the individual(s) or entity(ies) charged with administering the CFA Loan administration center 220. CFA Loan administration center 220 may further include module(s) for, among other things, assessing CFA Loan particulars, such as underwriting particulars, for example. Other modules may permit various manipulations of data (and access to such manipulated data) including, for example, house values, house purchase amounts, payment due dates if applicable, payment amounts, equity amounts, delivery dates, and other data or information utilized in the issuing and management of the CFA Loan as described herein. FIG. 10 shows exemplary modules that may be associated with the CFA Loan administration center.

CFA Loan administration center 220 may include, for instance, a workstation or workstations running the Microsoft Windows™ Vista™ operating system, Microsoft Windows™ XP™ operating system, Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform. CFA Loan administration center 220 may be operated and maintained by a financial institution, and any affiliates of the financial institution, to issue CFA Loans, effect payments, and terminate CFA Loans, for example.

Customer station 230 may be used by a customer (e.g. the borrower), for example to interface with the CFA Loan administration center 220 and input (or retrieve) information or data in connection with securing or maintaining a CFA Loan, for example. In one embodiment, for example, a borrower may interface with a graphical user interface (or GUI), for example, to input data and information through a predetermined form that queries for desired particulars on their particular CFA Loan, such as expected retirement date, benefits desired and length of benefit period, and assets or portfolio to be guaranteed, for example (see also FIG. 4). The interested party station 235 provides an interface to interested parties (other than the borrower) in a manner similar to the customer station 230.

Builder station 240 may be used by the builder of the customer's new house (i.e., in this example the house to be purchased by the customer/borrower is a new house and is owned by the builder of the house). That is, the builder station 240 may be used by the builder of the customer's new house to interface with the CFA Loan administration center 220 so as to input/retrieve information or data in connection with selling the house. In one embodiment, for example, a builder entity may interface with a graphical user interface (or GUI), for example, to input information through a predetermined form that queries for desired particulars on the CFA Loan, such as expected close date, purchase price of the new house, and terms of the financing under the CFA Loan, for example.

The stations 230, 235, and 240 may comprise or include, for instance, a personal or laptop computer running a Microsoft Windows™ 95 operating system, a Windows™ 98 operating system, a Millenium™ operating system, a Windows NT™ operating system, a Windows™ 2000 operating system, a Windows XP™ operating system, a Windows CE™ operating system, a PalmOS™ operating system, a Unix™ operating system, a Linux™ operating system, a Solaris™ operating system, an OS/2 ™ operating system, a BeOS™ operating system, a MacOS™ operating system, a VAX VMS operating system, or other operating system or platform. The stations 230, 235, and 240 may include a microprocessor such as an Intel x86-based or Advanced Micro Devices x86-compatible device, a Motorola 68K or PowerPC™ device, a MIPS device, Hewlett-Packard Precision™ device, or a Digital Equipment Corp. Alpha™ RISC processor, a microcontroller or other general or special purpose device operating under programmed control. The stations 230, 235, and 240 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The stations 230, 235, and 240 may be equipped with an integral or connectable cathode ray tube (CRT), a liquid crystal display (LCD), electro-luminescent display, a light emitting diode (LED) or another display screen, panel or device for viewing and manipulating files, data and other resources, for instance using a graphical user interface (GUI) or a command line interface (CLI). The stations 230, 235, and 240 may also include a network-enabled appliance such as a WebTV™ unit, a radio-enabled Palm™ Pilot or similar unit, a set-top box, a browser-equipped or other network-enabled cellular telephone, or another TCP/IP client or other device.

Communications network 210 may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection. Communications network 210 may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 210 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

Communications network 210 may be used by a user of the stations 230, as well as the CFA Loan administration center 220, for example, to transmit or receive data or information relating to the issuance, purchasing, processing and monitoring of CFA Loans in accordance with one embodiment of the invention described herein. For instance, a borrower may electronically submit information to an issuer of a CFA Loan in connection with taking a CFA Loan out, for example. The CFA Loan administration center 220 may use communications network 210 to transmit periodic reports to owners of CFA Loans, interface with various external systems in connection with the various features and functionality described herein, or to process payments made in connection with CFA Loans, for example. Other uses of communications network 210 are of course possible.

FIG. 10 illustrates exemplary modules that may be included in (or associated with) the CFA Loan administration center 220 for carrying out (or administering) the various functions and features of embodiments described herein. In some embodiments, the CFA Loan administration center 220 may include an underwriting processing module 221, a CFA Loan processing module 222, an external systems interaction module 224, a document production module 225, a CFA Loan pay-off module 226, an interest determination module 227, a home value determination module 228 and a reporting module 229. Other modules for performing the various and features and functionality of the systems and methods described herein may be provided. While the modules may not be used in all embodiments to perform some or all of the functions of the present invention, they are nonetheless presented as possible embodiments.

Underwriting processing module 221 may, in some embodiments, perform various underwriting processing, including risk assessment, in conjunction with issuing the CFA Loan. For example, the underwriting processing module 221 may be provided to analyze how much more expensive the new house might be vis-à-vis the old house, i.e., determine how much money might be financed. For example, it may be that the more elderly a borrower is, the greater the money that might be financed. The underwriting processing module 221, in general, may provide the underwriting guidelines under which the CFA Loan may be offered.

CFA Loan processing module 222 may, in some embodiments, provide the non-risk based processing associated with providing the CFA Loan. Such processing may work under the guidelines provided by the underwriting processing module 221. For example, the CFA Loan processing module 222 may calculate various parameters of the CFA Loan, such as payment amount (if any).

External systems interaction module 224 may, in some embodiments, interact or communicate with various external systems, including the stations 230, 235, 240, proprietary record-keeping systems, non-proprietary record-keeping systems, or any other system. For example, an administrator of CFA Loan administration center 220 may provide loan-related information to the reporting systems of banks or other financial institutions. In some embodiments, external systems interaction module 224 may also receive data or information that is electronically submitted by such external rule or regulatory system(s). In this way, the various features and functionality described herein can cooperate with the various systems and methods of various financial institutions in providing services and products to consumers.

The document production module 225 may, in some embodiments, provide the set of documents for closing the CFA Loan. That is, based on the various parameters associated with a particular CFA Loan, the document production module 225 would generate a suitable set of documents to effect the CFA Loan.

The CFA Loan pay-off module 226 may, in some embodiments, be provided to calculate the pay-off amount of the CFA Loan. That is, if the borrower decides to sell the new house, the CFA Loan pay-off module 226 would determine the amount due to settle the CFA Loan, e.g., based on the loan balance, secured value and resulting collectable proceeds amount.

The interest determination module 227 may, in some embodiments, monitor the amount and timing of the interest accrued against the loan and update the outstanding loan balance, as well as the collectable proceeds (the collectable proceeds being the amount that is collectable from the borrower). For example, if the CFA Loan is based on a variable interest rate, the interest determination module 227 may calculate the loan balance based on the variable rate.

The home value determination module 228 may, in some embodiments, be provided to determine how much value is currently in the new house. That is, as described herein, the equity in the new house (and corresponding collateral that such equity provides) is used to finance the new home. Thus, as the life of the CFA Loan passes by, the cumulating loan balance may surpass the value of the home. The home value determination module 228 keeps track of the loan balance (as well as the collectable proceeds and secured value), and when linked with other reporting modules, may provide the Company detailed information regarding whether/when the loan balance will surpass the value of the home, i.e., the secured value, for example.

Reporting module 229 may, in some embodiments, report particulars about the various features and functionality described herein to customers, borrowers, CFA Loan administration center 220 administrators and other persons or entities. For example, reporting module 229 may provide a customer with particulars on the CFA Loan schedule, value of the house, equity in the house, or any other data or information that may be relevant to an interested party.

As described above, the drawings show various embodiments of the system of the invention. In particular, FIGS. 1-8 show various steps of embodiments the invention and FIGS. 9 and 10 show an illustrative system. In addition to the various computer implementation aspects described above, hereinafter, further aspects of contemplated implementation will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processors and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, two memory portions, as described above, may perform the memory storage performed by one distinct memory portion.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

In conclusion, today, an unmet need exists for borrowers, and in particular senior borrowers, in affording them the opportunity to move from their existing home into a more expensive home and/or living situation due to a variety of reasons. This new innovation will help senior borrowers meet that need by allowing them to move into the home of their dreams and/or needs while not being required to pay any (or any substantial) payments or repay the loan for as long as the home is occupied.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A method to finance a transition of a borrower between ownership of a prior home to ownership of a new home in conjunction with services, the method comprising:
   determining the value of the prior home;
   establishing, using a processing machine, at the time of purchase of the new home, a loan balance associated with the new living situation cost, the new living situation cost including:
   the cost to purchase the new home, and
   the cost of the services, the services incurred by the borrower during occupation of the new home, and
   wherein the loan balance includes periodic accumulated interest plus principle and constitutes collectable proceeds up to a value of the new home, such that the collectable proceeds is limited to a secured value of the new home; and
   performing processing, by the processing machine, to use the value of the prior home as equity in the new home and as collateral for the collectable proceeds, and proceeds from sale of the prior home, based on the value of the prior home, being collected and passing into the equity of the new home so as to finance the transition of the borrower between ownership of the prior home to ownership of the new home in conjunction with the services; and
   generating respective values, by the processing machine, to represent the equity in the new home and the collateral for the collectable proceeds;
   the method constituted of financing a transition of a borrower between ownership of the prior home to ownership of the new home in conjunction with the services such that the transition is associated with an increase in living situation cost of the borrower between a prior living situation cost and the new living situation cost, the new living situation cost including the new home and the services, the method alleviating cash flow burden to the borrower resulting in minimal monthly payments for as long as the borrower occupies the new home, and
   the new home being purchased prior to the sale of the prior home; and
   wherein the value of the prior home is determined based on a sale of the prior home.

2. The method of claim 1, further including using equity of the home as the secured value whereby the collectable proceeds at any point in time is limited to the lesser of the loan balance and the secured value of the home, the loan balance including at least one selected from the group consisting of principal, interest, and associated fees.

3. The method of claim 1, further including effecting a first financing component, the first financing component including financing the new living situation cost, using the equity in the new home as collateral, beginning after one year from purchase of the new home by the borrower.

4. The method of claim 3, further including effecting a second financing component, the second financing component including providing bridge financing for a first year that the borrower occupies the home.

5. The method of claim 4, wherein the first financing component and the second financing component are financed in one transaction.

6. The method of claim 1, financing the new living situation cost using the equity in the new home as collateral beginning immediately upon purchase of the new home.

7. The method of claim 1, further comprising paying a cost gap to the borrower wherein the cost gap is the difference between the purchase price of the new home and the value of the prior home with the price of the new house being greater than the value of the prior house.

8. The method of claim 1, wherein the proceeds of sale of the prior home is applied to purchase of the new home and/or the cost of the services.

9. The method of claim 1, wherein the value of the prior home is determined based on a valuation of the prior home, prior to the sale of the prior home.

10. The method of claim 9, wherein the new home is purchased prior to the sale of the prior home, the method further comprising funding, by a company, both (1) an amount based on the valuation of the prior home, and (2) a cost gap between value of the prior home vis-à-vis purchase price of a more expensive new home.

11. The method of claim 10, the method further comprising paying the company funds resulting from sale of the prior home, the sale and the receiving funds occurring after the new home has been purchased and the loan balance is accruing.

12. The method of claim 9, wherein the new home is purchased prior to the sale of the prior home, the method further comprising funding, by a company, both (1) an amount based on the value of the prior home, and (2) a cost gap between value of the prior home vis-à-vis the more expensive new living situation.

13. The method of claim 1, wherein either (a) the new home is new to the borrower, and was previously owned by another, or (b) the new home is new construction such that the borrower is the first one to live in the house.

14. The method of claim 1, wherein the method is implemented using a computer system.

15. The method of claim 14, the computer system being maintained by a financial institution.

16. The method of claim 14, the computer system being maintained by one of an insurance company and a bank.

17. The method of claim 1, the purchase of the new home occurring simultaneously or almost simultaneously with setting up the financing of the new home via equity being used as collateral for the loan.

18. The method of claim 17, wherein the purchase of the new home occurs in the same closing event as the setting up the funding and is effected by one set of documents.

19. The method of claim 17, wherein the purchase of the new home and the setting up the funding occurs within three weeks of each other.

20. The method of claim 1, wherein little or no monthly payment is made out of pocket from the borrower, the payments instead being funded via equity in the new home used as collateral for the loan.

21. The method of claim 1, the financing including a reverse mortgage that is collateralized using equity in the new home.

22. The method of claim 20, the financing including a commitment by the borrower to pay at least one selected from the group consisting of homeowner association costs, homeowner insurance costs and property taxes.

23. The method of claim 1, wherein the services include at least one selected from the group consisting of a lump cash outlay, a periodic cash outlay, a food service, long term care service, nursing care, independent living care, and community fees.

24. The method of claim 1, providing both financing for the new home and additional funds to be used to pay for a variety of services in the new, more expensive living situation.

25. A system that performs processing to finance a transition of a borrower between ownership of a prior home to ownership of a new home in conjunction with services, the system comprising:
 a computer module, tangibly disposed in a processing machine, that determines the value of the prior home;
 a computer module, tangibly disposed in a processing machine, that establishes, at the time of purchase of the new home, a loan balance associated with the new living situation cost, the new living situation cost including:
  the cost to purchase the new home, and
  the cost of the services, which may be in the form of monthly payments to the borrower, the services incurred by the borrower during occupation of the new home, and
 a computer module, tangibly disposed in a processing machine, that calculates the loan balance, which includes periodic accumulated interest plus principle and constitutes collectable proceeds up to a value of the new home, such that the collectable proceeds is limited to a secured value of the new home, the value of the prior home being used as equity in the new home and as collateral for the collectable proceeds, and
 proceeds from sale of the prior home, based on the value of the prior home, being collected and passing into the equity of the new home so as to finance the transition of the borrower between ownership of the prior home to ownership of the new home in conjunction with the services; and
 a computer module, tangibly disposed in a processing machine, that outputs a report regarding the financing; and
  the transition of the borrower between ownership of the prior home to ownership of a new home in conjunction with the services being performed such that the transition is associated with an increase in living situation cost of the borrower between a prior living situation cost and the new living situation cost, the new living situation cost including the new home and the services, the transition alleviating cash flow burden to the borrower by resulting in minimal monthly payments for as long as the borrower occupies the home;
 the new home being purchased prior to the sale of the prior home; and
 wherein the value of the prior home is determined based on a sale of the prior home.

26. The method of claim 1, wherein the cost of the services is in the form of monthly payments to the borrower.

\* \* \* \* \*